(12) United States Patent
Wang et al.

(10) Patent No.: US 6,470,382 B1
(45) Date of Patent: Oct. 22, 2002

(54) METHOD TO DYNAMICALLY ATTACH, MANAGE, AND ACCESS A LAN-ATTACHED SCSI AND NETSCSI DEVICES

(75) Inventors: Peter Si-Sheng Wang, Cupertino; Charles Hardin, Sunnyvale, both of CA (US)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/320,377

(22) Filed: May 26, 1999

(51) Int. Cl.[7] ................................. G06F 13/00
(52) U.S. Cl. ................. 709/220; 709/250; 709/326; 710/3; 710/104
(58) Field of Search ................. 709/217, 218, 709/223, 225, 227, 230, 237, 250, 313, 321, 326, 220, 221; 710/2, 3, 72, 74, 101, 104, 105; 395/500.46

(56) References Cited

U.S. PATENT DOCUMENTS 5,491,812 A * 2/1996 Pisello et al. .......... 395/500.46
5,568,612 A * 10/1996 Barrett et al. ............... 709/203
5,721,880 A * 2/1998 McNeill, Jr. et al. ... 395/500.46
5,991,813 A * 11/1999 Zarrow ....................... 709/236
5,996,024 A * 11/1999 Blumenau ................... 709/321
6,209,023 B1 * 3/2001 Dimitroff et al. ........... 709/211

* cited by examiner

*Primary Examiner*—Viet D. Vu
(74) *Attorney, Agent, or Firm*—Wagner Murabito & Hao LLP

(57) ABSTRACT

A method to dynamically attach, manage, and access a LAN-attached SCSI and netSCSI device to a network. In one embodiment, the present invention recites a method for dynamically attaching, managing, and accessing a netSCSI device coupled to a network. In one step, a broadcast message from the netSCSI device, providing a network address of the netSCSI device, is received at a computer coupled to the network. In another step, the network address of the netSCSI device is mapped to a logical SCSI ID in the computer. With another step, the computer claims ownership of the netSCSI device by transmitting a message of ownership to it and including its own, network address. Finally, communication to the netSCSI device is performed by accessing the address map.

25 Claims, 10 Drawing Sheets

Prior Art Fig. 1

METHOD TO DYNAMICALLY ATTACH, MANAGE, AND ACCESS A LAN-ATTACHED SCSI AND NETSCSI DEVICES

TECHNICAL FIELD

The present, claimed invention relates to the field of SCSI and netSCSI devices and networks. Specifically, the present claimed invention relates to an apparatus and a method for dynamically attaching, managing, and accessing a LAN-attached SCSI and netSCSI devices.

BACKGROUND ART

The Small Computer System Interface (SCSI) is a parallel interface standard between computers and peripheral components. The SCSI standard was originally designed to support peripherals such as hard drives, CD-ROM drives, scanners, etc. on a stand alone computer. While the SCSI standard provides a generic interface that is very useful, the SCSI standard also has serious limitations. Specifically, the SCSI standard only allows a limited number of SCSI devices, usually eight to sixteen, on the parallel SCSI bus. Furthermore, the transmission distance, per hub and for the total length, of a SCSI bus is extremely limited. However, the SCSI standard is still important because SCSI devices are ubiquitous. In view of these circumstances, a need arises for a method and apparatus for accommodating more SCSI devices on a bus and for placing them at greater distances on the bus.

One method of overcoming the limitations of a SCSI bus is to simply use a network other than a SCSI bus. For example Server area networks (SAN) currently use a Fiber Channel (FC) medium to communicate with SCSI devices. Another type of network that could be used is a Local Area Network (LAN) or an Internet Protocol (IP) Network.

Additionally, there is a trend in the industry to remove, or unbundle, peripherals from a computer, usually a server, and place them independently on the network. The goal is to have peripherals on a network such that one or more servers can access the same device. Consequently, each server could own a part of the peripheral, e.g. a drive, and perceive the drive as its own local drive. NetSCSI device were developed for this purpose. A netSCSI device is a SCSI device having the appropriate hardware and software to make it compatible with a communication network link and communication network protocol. However, a specific method and apparatus does not exist for managing SCSI devices without a netSCSI configuration on a network. Hence, a need arises for a method and apparatus for attaching and managing SCSI devices on a network.

Conventionally, a netSCSI device has to be programmed with the appropriate network address of an owner prior to being placed on the network. Usually this is performed by a dedicated administrative computer that maps the grouping and ownership of SCSI devices to host computers. However, this creates a bottleneck to placing new netSCSI devices on the network. Hence, a need arises for a network system and method to automatically and dynamically attach, manage, and configure a netSCSI device on the network itself.

A conventional SCSI system 100 is presented in Prior Art FIG. 1. SCSI system 100 has a plurality of SCSI devices 102, 104, and 106 attached thereto. A bus 114 couples SCSI devices 102, 104, and 106 to a computer 120. However, several limitations exist as,to how SCSI devices are identified on a FC network and how to send information to the SCSI devices. First, traditional SCSI devices require the user to select the address, dial it up on the device, and hope that it does not conflict with an address chosen for an existing SCSI device on the network. As an example, SCSI-3 devices 102, 104, and 106 could have a respective SCSI address switch 108, 110, and 112 on the actual device that a user manually dials to a desired unique code. Note that the parallel SCSI address is commonly limited to 5 bits, e.g. having a decimal equivalent address of 0–31. In this example, address of 5, 7, and 30 were chosen for the SCSI address of the devices in FIG. 1. However, if SCSI address switch 108, 110, and 112 chosen by the user happened to conflict with another device already in use, the system will not respond properly. For example, if a user dials in an address of 17 instead of 5 for address switch 108 for SCSI-3 102, it would conflict with the address 17 for address switch 110 for SCSI-3 104.

Second, SCSI devices may not continue to function correctly when the bus is 'broken', e.g. when a user intermittently connects or disconnect a SCSI device from the network without following the correct protocol. Unless the SCSI bus and device are in a high-end RAID enclosure that supports hot-plug, e.g. connecting or disconnecting while unit is operating and without following the correct protocol, the SCSI bus cannot recover gracefully once the bus is 'broken.' Hence, a need exists for a method and apparatus for dynamically addressing SCSI devices that would automatically avoid address conflicts when installing new devices and when the bus is broken.

Bus 114 of FIG. 1 could be a non-SCSI network, such as the FC link. An FC network has features that allow new devices to be recognized and mapped to SCSI operations automatically. However, this address mapping method is only a rudimentary mapping of the SCSI ID to the FC address. Additionally, special configuration SCSI devices, specifically SCSI-3 devices, would be required for automatic addition and removal capability on network 100. Thus, SCSI devices 102, 104, and 106 would be SCSI-3 configuration. Furthermore, the FC network mapping is not applicable to a LAN or IP network. Hence, a need arises for a method and apparatus to allow SCSI devices to be attached to the LAN, be recognized by the hosts/clients and other SCSI devices on the same LAN or IP network automatically, and for the LAN/IP address of the netSCSI device to be bound to a logical SCSI ID. An additional need exists to allow the use of standard SCSI devices on a network such that backwards compatibility is maintained. If such a network for SCSI devices existed, a further need would exist for a protocol in which to encapsulate data and SCSI commands)into a coherent network-compatible packet.

In summary, a need exists for a method and apparatus for accommodating more SCSI devices on a bus and for placing them at greater distances on the bus than would be feasible with a conventional SCSI bus. Hence, a need arises for a method and apparatus for attaching and managing SCSI devices on a network. Hence, a need arises for a network system and method to automatically and dynamically attach, manage, and configure a netSCSI device on the network itself. Also, a need exists for a method and apparatus for dynamically addressing SCSI devices that would automatically avoid address conflicts when installing new devices and when the bus is broken. Furthermore, a need arises for a method and apparatus to allow SCSI devices to be attached to the LAN, be recognized by the hosts/clients and other SCSI devices on the same LAN or IP network automatically, and for the LAN/IP address of the netSCSI device to be bound to a logical SCSI ID. An additional need exists to allow the use of standard SCSI devices on a network such that backwards compatibility is maintained. Finally, a need exists for a protocol in which to encapsulate data and SCSI commands into a coherent network-compatible packet. The present invention provides a unique and novel solution that meets all the above needs.

DISCLOSURE OF THE INVENTION

The present invention provides a method and apparatus for dynamically attaching, managing, and accessing a LAN-attached netSCSI device.

In one embodiment, the present invention recites a method for dynamically attaching, managing, and accessing a netSCSI device coupled to a network. More specifically, the present embodiment performs this method using broadcast messaging and local addressing. In one step, a broadcast message of announcement from the netSCSI device, providing a network address of the netSCSI device, is received at a computer coupled to the network. In another step, the network address of the netSCSI device is mapped to a logical SCSI ID in the computer. Then, the computer may claim ownership of the netSCSI device by sending it a response message claiming ownership and providing its network unicast address for two-way communication. The netSCSI device records the owner's network unicast address for sending reply messages to the owner. Finally, the host computer owner may communicate with the netSCSI device by accessing the address map and formatting and encapsulating a SCSI packet in a network packet format using the netSCSI's network address retrieved from the address map. This embodiment uses local address mapping where each computer on the network performs the address mapping function independently of each other. After a computer claims ownership of the netSCSI device, the computer and netSCSI device communicate using unicast messaging.

As a result, the present invention provides a convenient and useful method of attaching, managing, and accessing netSCSI devices on a network. This is accomplished by replacing the SCSI bus limitations with the more generous network limitations. With a network, more netSCSI devices can be used, and the distance from the netSCSI device to a computer is greater. For example, the quantity of netSCSI devices allowed 6n a network is limited to the quantity of unique possibilities with a 32 or 48 bit network address. Also, the distance of a SCSI device on a network is limited by the specific type of network and protocol. In any case, the network provides orders of magnitude in improvement over the SCSI distance limitation.

In a second embodiment, the present invention recites another method for dynamically attaching, managing, and accessing a netSCSI device coupled to a network. The second embodiment, however, performs this method using multicast messaging and centralized addressing. In this method, a directory server computer is given a well-known network address. The new netSCSI device transmits its unicast network address to the well-known multicast address automatically to initiate the dynamic attachment steps. Upon receiving the initial announcement, the directory server assigns a logical SCSI ID and a network multicast address for the netSCSI device that is unique within the network. The directory server then transmits the assignment information to the netSCSI device or to computers having the network multicast address. The netSCSI device transmits the message of assignment to devices having the assigned network multicast address. The message provides the netSCSI device's unicast network address and the logical SCSI ID assigned to it by the directory server, the logical SCSI bus and network multicast address of the logical SCSI bus. This multicast message essentially allows the netSCSI device to advertise to other devices on the logical SCSI bus that it is available to be owned. Any computer within the assigned network multicast address that wishes to own the netSCSI device can record the netSCSI unicast network address, logical SCSI ID, logical bus and network multicast address, and then send a response message to the netSCSI device claiming the ownership and providing its own unicast network address so the hnetSCSI device can communicate with it.

BRIEF DESCRIPTION OF THE DRAWINGS

The accompanying drawings, which are incorporated in and form part of this specification, illustrate embodiments of the invention and, together with the description, serve to explain the principles of the invention. The drawings referred to in this description should be understood as not being drawn to scale except as specifically noted.

PRIOR ART

BEST MODE FOR CARRYING OUT THE INVENTION

Figure 1:
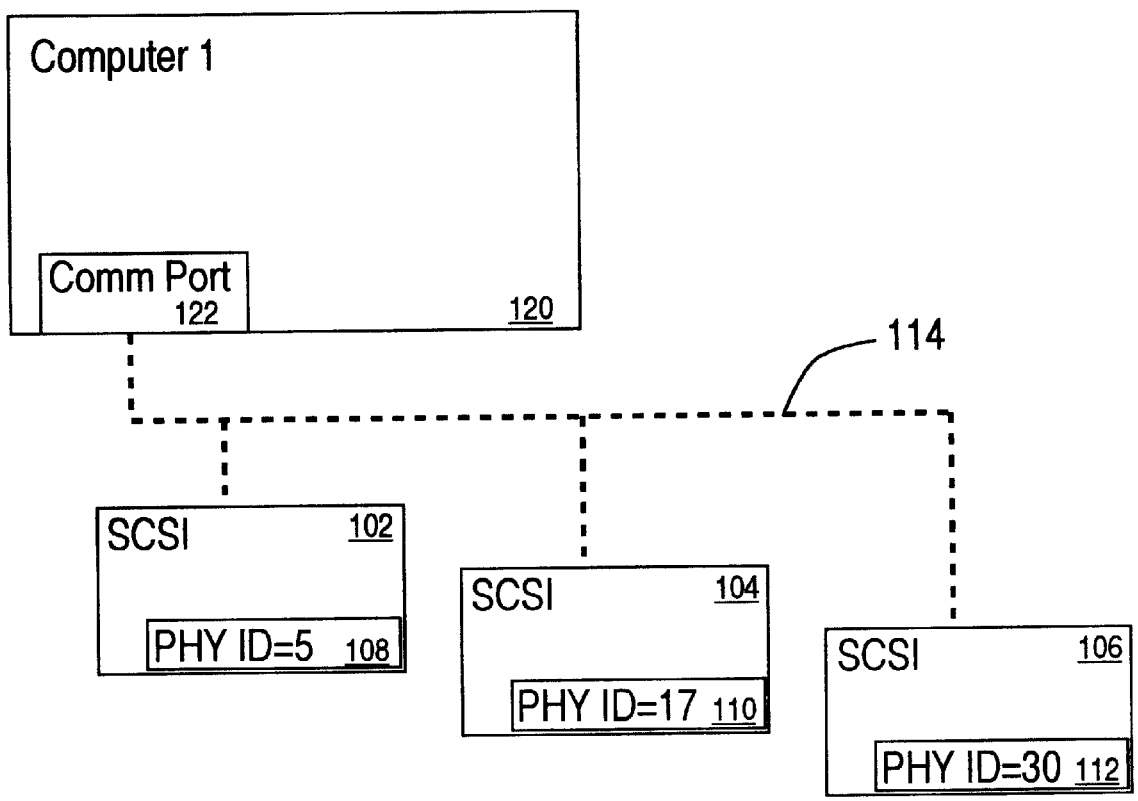
FIG. 1 is a conventional computer with a conventional arrangement of SCSI devices.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail as not to unnecessarily obscure aspects of the present invention.

NOTATION AND NOMENCLATURE

Some portions of the detailed descriptions which follow (e.g., the processes) are presented in terms of procedures, logic blocks, processing, and other symbolic representations, of operations on data bits within a computer or digital system memory. These descriptions and representations are the means used by those skilled in the data processing arts to most effectively convey the substance of their work to others skilled in the art. A procedure, logic block, process, etc., is herein, and generally, conceived to beta self-consistent sequence of steps or instructions leading to a desired result. The steps are those requiring physical manipulations of physical quantities. Usually, though not necessarily, these physical manipulations take the form of electrical or magnetic signals capable of being stored, transferred, combined, compared, and otherwise manipulated in a computer system. For reasons of convenience, and with reference to common usage, these signals are referred to as bits, values, elements, symbols, characters, terms, numbers, or the like with reference to the present invention.

It should be borne in mind, however, that all of these terms are to be interpreted as referencing physical manipulations and quantities and are merely convenient labels and are to be interpreted further in view of terms commonly used in the art. Unless specifically stated otherwise as apparent from the following discussions, it is understood that throughout discussions of the present invention, terms such as "processing" or "computing" or "generating" or "calculating" or "determining" or "displaying" or the like, refer to the action and processes of a computer system, or similar electronic computing device, that manipulates and transforms data. The data is represented as physical (electronic) quantities within the computer system's registers and memories and is transformed into other data similarly represented as physical quantities with in the computer system memories or registers or other such information storage, transmission or display devices.

NETWORK LINKED COMPUTER

Figure 2:
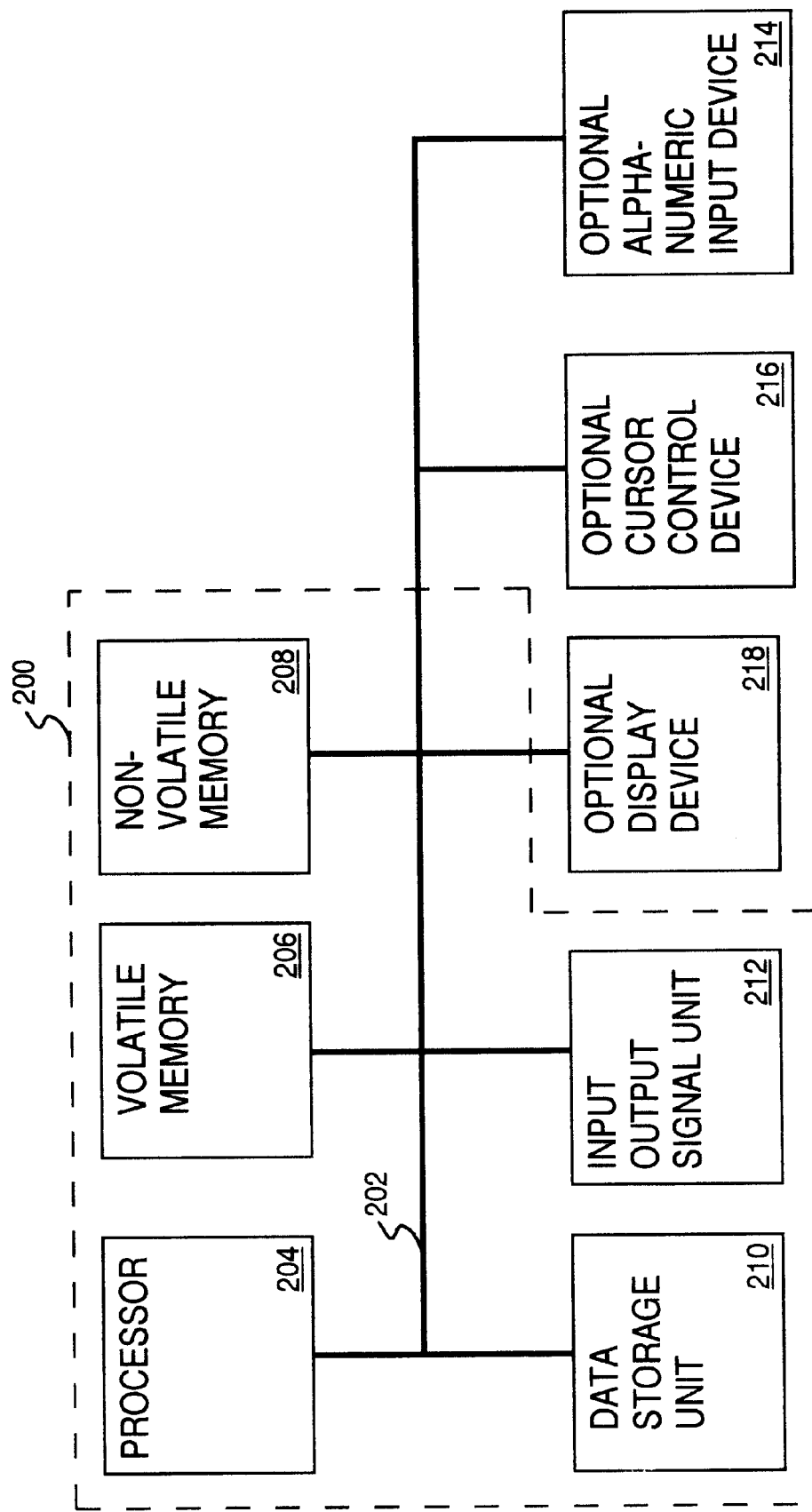
FIG. 2 shows a block diagram of a computer system used for dynamically attaching, managing, and accessing a SCSI device coupled to a network, in accordance with one embodiment of the present invention.

An exemplary computer system 200 on which resides the steps for dynamically attaching, managing, and accessing a netSCSI and a SCSI device coupled to a network, is presented in FIG. 2. It is appreciated that exemplary computer system 200 is exemplary only and that the present invention can operate within a number of different computer systems including general purpose computer systems, embedded computer systems, and stand alone computer systems specially adapted for network operation.

System 200 of FIG. 2 includes an address/data bus 202 for communicating information, and a central processor unit 204 coupled to bus 202 for processing information and instructions. System 200 also includes data storage features such as a computer usable volatile memory 206, e.g. random access memory (RAM), coupled to bus 202 for storing information and instructions for central processor unit 204, computer usable non-volatile memory 208, e.g. read only memory (ROM), coupled to bus 202 for storing static information and instructions for central processor unit 204, and a data storage unit 210 (e.g., a magnetic or optical disk and disk and a disk drive) coupled to bus 202 for storing information and instructions. An input output signal unit 212 (e.g. a modem or network interface card (NIC)) coupled to bus 202 is also included in system 200 of FIG. 2 to communicate with peripheral devices. System 200 of the present intelligent power management interface also includes an optional alphanumeric input device 214 including alphanumeric and function keys, coupled to bus 202 for communicating information and command selections to central processor unit 204. System 200 also optionally includes a cursor control device 216 coupled to bus 202 for communicating user input information and command selections to central processor unit 204. System 200 of the present embodiment also includes an optional display device 218 coupled to bus 202 for displaying information.

NETWORK SYSTEMS

Figure 3A:
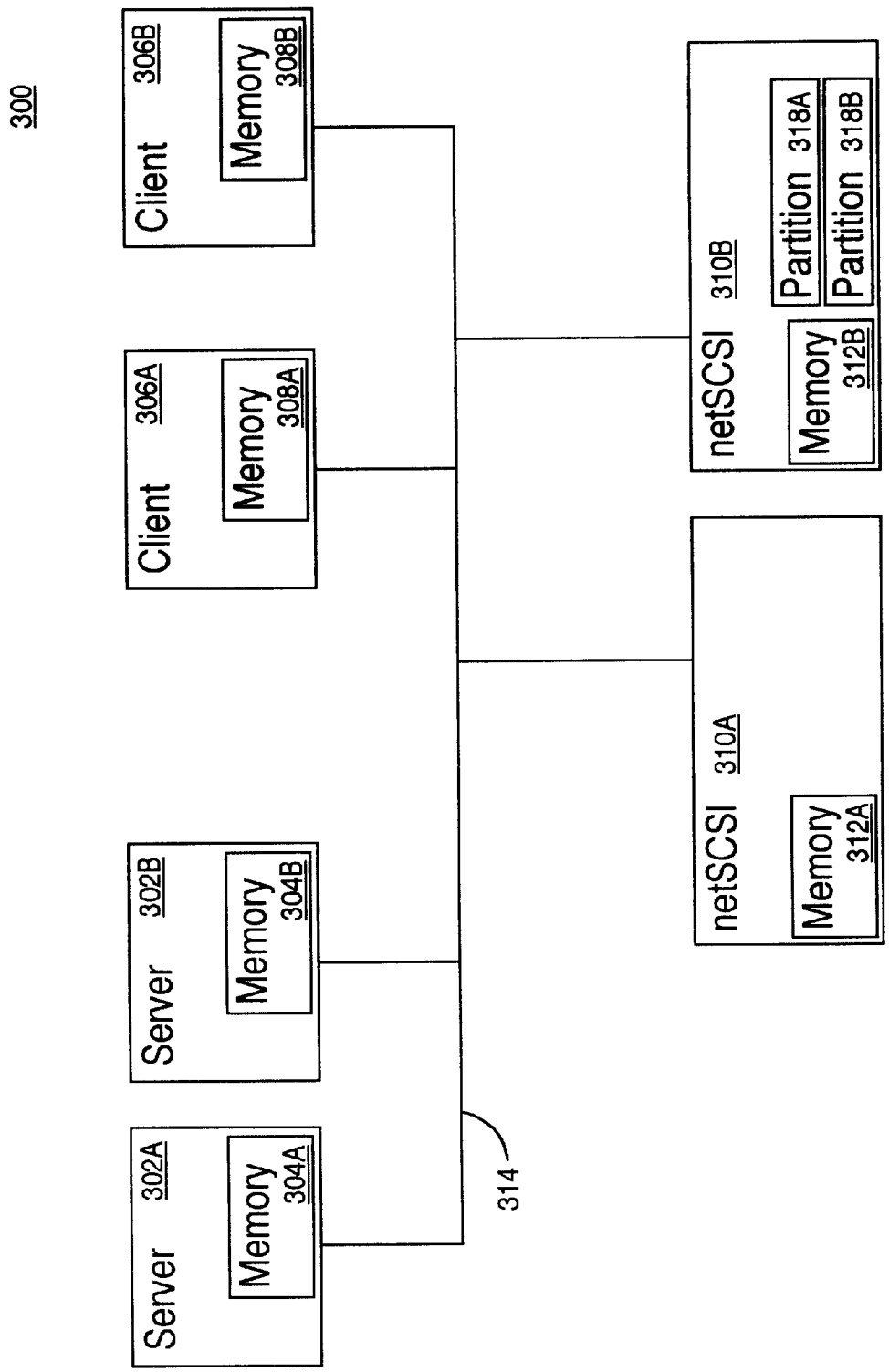
FIG. 3A shows a block diagram of a network system for dynamically attaching, managing, and accessing a netSCSI device coupled to a network, in accordance with one embodiment of the present invention.

A block diagram of a network system 300A for dynamically attaching, managing, and accessing a netSCSI device coupled to a network is presented in FIG. 3A. Network system 300A in the present embodiment is comprised of netSCSI device 310A and NetSCSI device 310B, coupled to server 302A and server 302B via a network link 314. Network link 314 in the present embodiment is a twisted pair Local Area Network (LAN) line. However, the present invention is well suited to alternative network link configurations on alternative network systems, including but not limited to full duplex, half duplex, on Internet Protocol (IP) network, etc. NetSCSI devices 310A and 310B can be partitioned at the discretion of the user. In the embodiment presented for FIG. 3A, netSCSI 310B has a hard drive that is partitioned into two. Hence, it creates two separately partitioned drive portions 318A and 318B. If a device is partitioned, each partition can be owned by a different host computer. The present invention can be applied to a SCSI device with or without a partition. NetSCSI devices 310A and 310B each have a memory block 312A and 312B, respectively. Similarly, server 302A, and server 302B each have a memory block 304A and 304B, respectively. Likewise, client computer 306A and client computer 306B each has a memory block 308A and 308B, respectively.

The steps for performing the dynamic addressing, managing, access etc. of netSCSI devices 310A and 310B on network 300A will be addressed hereinafter. While the present embodiment presents two server computers 302A and 302B and two client computers 306A and 306B, and two netSCSI devices 310A and 310B, the present invention is well suited to using less or more of each of these components in the network. For example, the present invention theoretically can dynamically address, manage, and access a quantity of SCSI devices limited only by the quantity of unique addresses available in the 32 bit IP address, the 48 bit MAC address, or the SCSI address limitation in combination with the virtual bus address limitation.

Figure 3B:
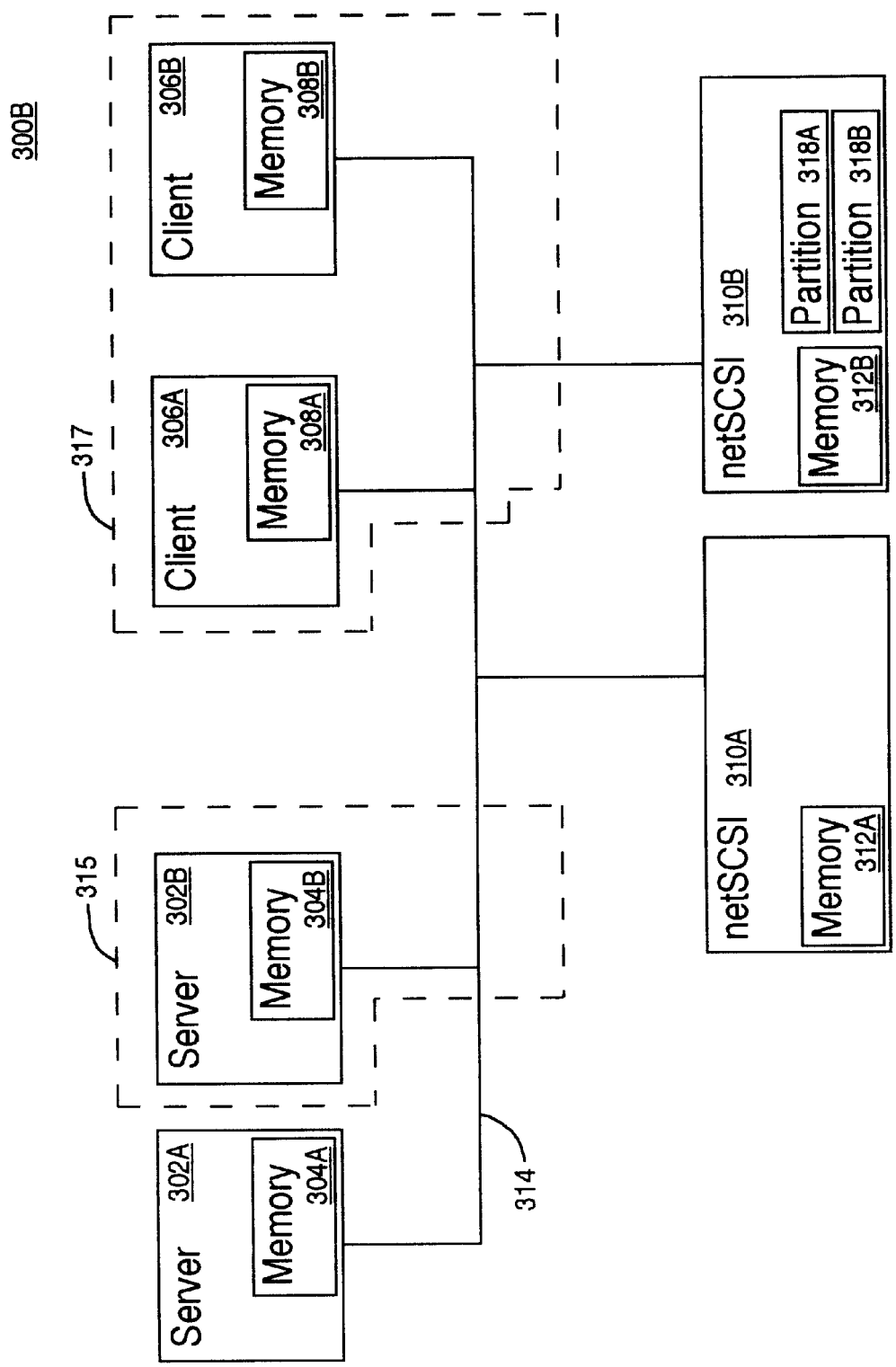
FIG. 3B shows a block diagram of a network system for dynamically attaching, managing, and accessing a netSCSI device coupled to a network and arranged in multicast groups, in accordance with one embodiment of the present invention.

A block diagram of a network system for dynamically attaching, managing, and accessing a netSCSI device coupled to the network system, wherein the device is grouped in a multicast group, is presented in FIG. 3B. This embodiment is similar to FIG. 3A, except that it includes a multicast grouping arrangement. With multicast grouping, network devices, including computers and SCSI devices, only communicate to another device within their allocated multicast group. Thus, while the typical device broadcasts a message on the network that every device will receive and interpret, the multicast address, indicates which devices should receive and interpret the message behind the multicast address. The multicast group arrangement has the same essential physical connection as the broadcast group arrangement of FIG. 3A. It is the program instructions residing in the devices that dictate a multicast group arrangement.

In FIG. 3B, the multicast grouping is visually illustrated by a dashed line that represents a first multicast group 315 that includes server 302B. This first multicast group 315 has been assigned the random multicast group address of "01:01:02:03:04:50." Similarly, a dashed line represents a second multicast group 317 includes client computers 306A and 306B. This second multicast group 317 has been assigned the random multicast group address of "01:01:02:03:04:70." These address assignments will be carried through the examples presented in the detailed description of the dynamic attachment, addressing and managing, hereinafter. The importance of using multicast messages is that it reduces network traffic and work load on the devices coupled to the network. It does so by using the multicast message to limit which devices should read an attached message. The multicast scheme also provides a useful tool for users and network administrators to provide selective service, grouping, and privileges. Hence, the ability to dynamically attach manage, and access a netSCSI device coupled to the network system using a multicast scheme provides a valuable tool to users and network administrators.

Figure 3C:
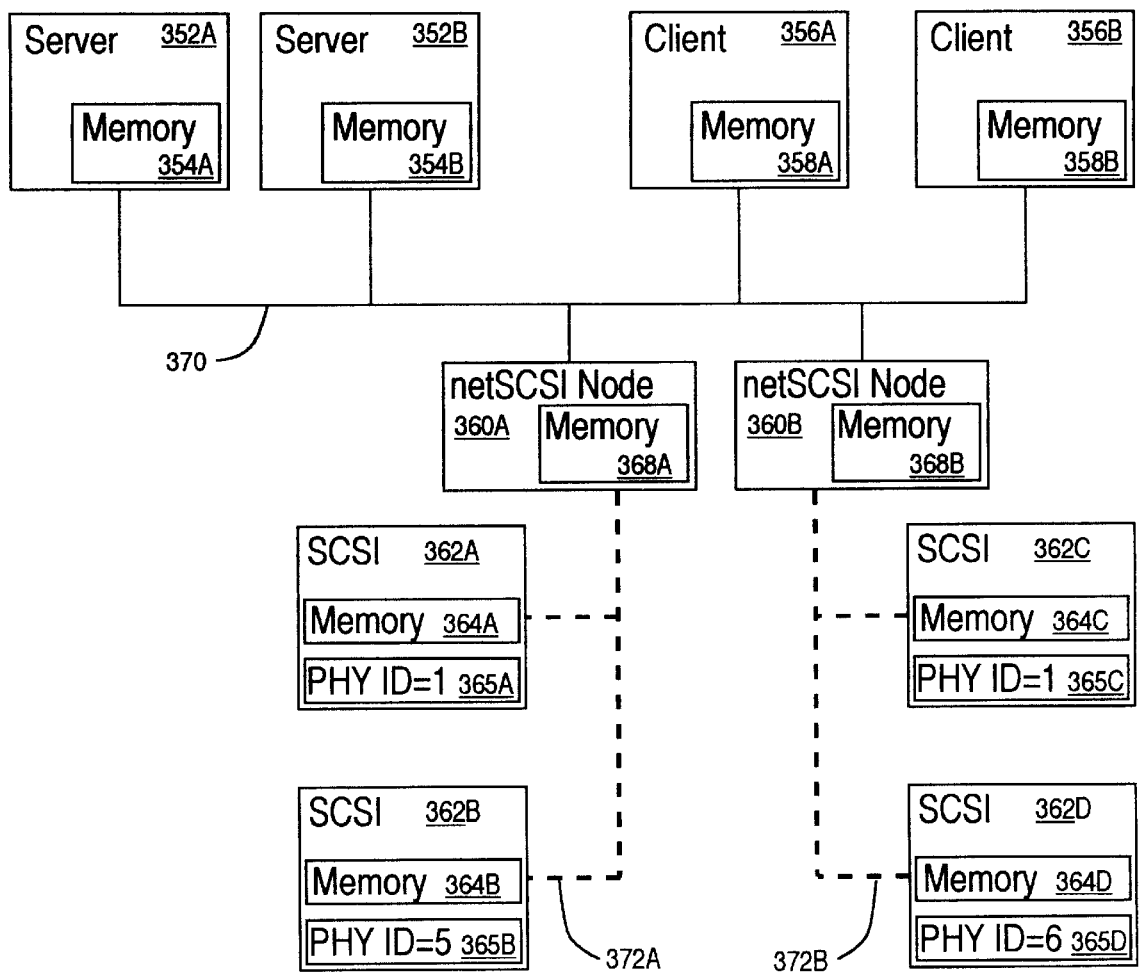
FIG. 3C shows a block diagram of a network system for dynamically attaching, managing, and accessing a SCSI device coupled to a network via a netSCSI node, in accordance with one embodiment of the present invention.

A block diagram of a network system for dynamically attaching, managing, and accessing a SCSI device coupled to a netSCSI node, and the network, via a SCSI bus is presented in FIG. 3C. The significance of this figure is that a non-network compatible device the SCSI device, can be attached to the network, and subsequently, can be dynamically attached, managed and accessed using methods provided herein. This embodiment is similar to FIG. 3A, except that it now couples SCSI devices 362A and 362B, and SCSI devices 362C and 362D, that do not have a netSCSI configuration, downstream of a netSCSI node 360A and 360B respectively. Consequently, SCSI devices 362A and 362B, and SCSI devices 362C and 362D are firstly coupled to a SCSI bus 372A and 372B, respectively, that is, in turn, coupled to a netSCSI Node 360A and 360B respectively. In this manner, devices that are not network compatible, e.g. non-netSCSI devices such as a SCSI device, can be linked to a network via a netSCSI node and subsequently be managed and accessed using the present invention. Thus, netSCSI Nodes 360A and 360B provide the necessary interface between the network link 370 and SCSI buses 372A and 372B, respectively.

Similar to FIG. 3A, FIG. 3C illustrates two servers 352A and 352B, that are coupled to the NetSCSI nodes 360A and 360B and to client computers 356A and 356B, respectively, via a network link 370. While the present embodiment presents two server computers 352A and 352B and two client computers 356 and 356B, and two netSCSI devices 360A and 360B, and four SCSI devices 362A, 362B, 362C, and 362D, the present invention is well suited to using less or more of each of these components. The steps for performing the dynamic addressing, managing, access etc. of netSCSI devices 360A and 360B and SCSI devices 362A, 362B, 362C, and 362D on network 300B will be addressed hereinafter.

DYNAMIC ATTACHING, MANAGING AND ACCESSING NETSCSI AND SCSI DEVICES ON A NETWORK

Four basic combinations of dynamic addressing of SCSI devices on a network will be discussed in this section. The combinations are formed from orthogonal variables of the location of addressing and of the grouping. The location of the addressing can be local, at an individual host device coupled to the network, or it can be central, e.g. at a dedicated directory server. The grouping of the devices can be in a multicast or in a broadcast arrangement. Each of the four basic methods of dynamic addressing can also include an option of including several layers of nested SCSI devices below the netSCSI device, per the standard SCSI protocol. Several alternative embodiments exist for the specific embodiments illustrated herein. For example, each of the four basic methods of dynamic addressing can also include an option of using a logical SCSI bus in the address mapping according to standard SCSI protocol, thus providing an additional hierarchical layer of organization. Overall, each combination of addressing and messaging has their own intrinsic benefits, and is selected based on the needs and capabilities of the user and network.

The choices for the location of the addressing have intrinsic benefits and disadvantages. Central addressing provides the benefit of a consistent address for a given SCSI device once it is address mapped, even if it is disconnected and reconnected. It also provides more control to a network administrator for allocating resources, etc. However, it requires a dedicated host computer. On the other hand, local addressing provides a less controlled method of addressing that may not be consistent if a SCSI device is mapped and claimed, but then disconnected from the network. Upon reattaching to the network, it may be claimed by a different local device. The present invention is applicable to both forms of addressing. Each will be described hereinafter.

Similarly, the choices for the grouping of devices also have intrinsic benefits and disadvantages. Multicast messaging allows devices to be grouped together. This provides network administrators and users with a segregation tool with which to provide service, allocate resources, etc. It also reduces network traffic in that multicast messages are only interpreted by devices within the multicast group. Thus, devices not in the group do not interpret the message, and thereby conserve their resources. A device that broadcasts a message essentially sends it to every device on the network. Thus, every device must interpret the message. This can be a detriment in that broadcast messaging tends to load down a large network.

LOCAL ADDRESSING USING BROADCAST MESSAGES

Figure 4A:
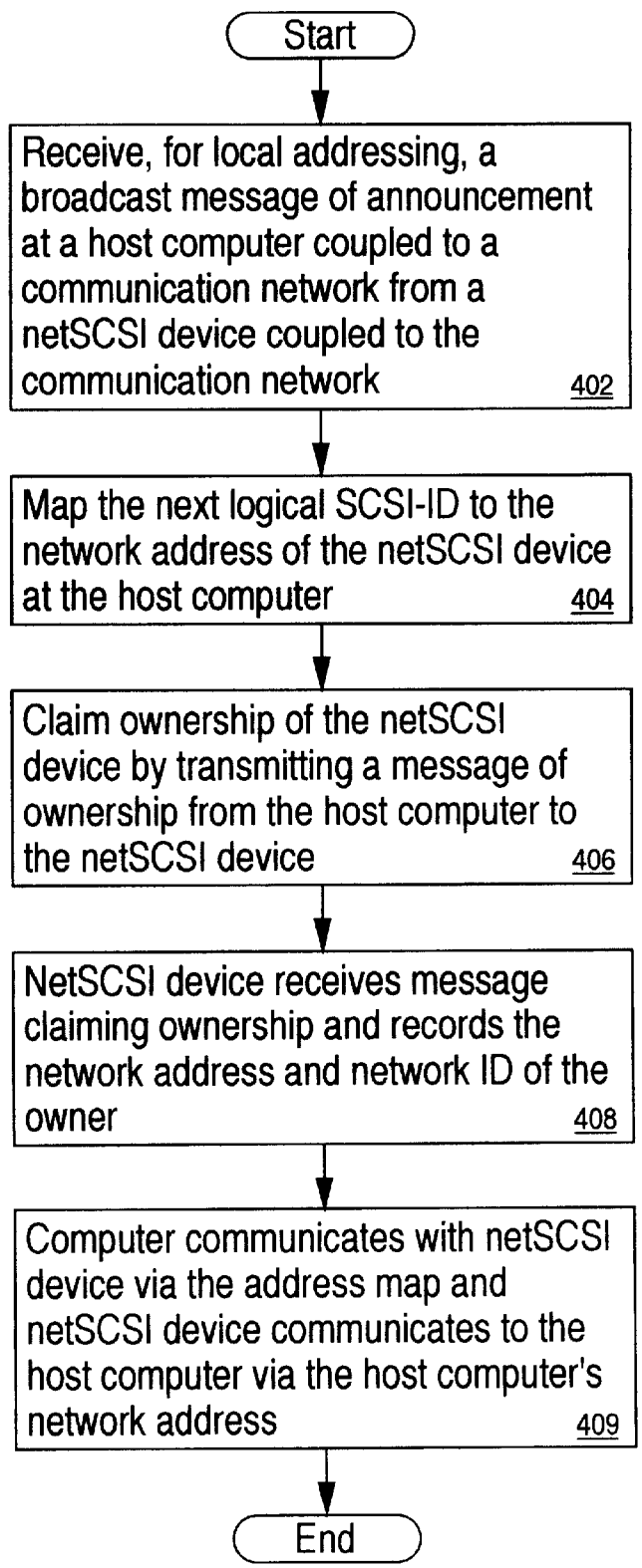
FIG. 4A is a flow chart of the steps performed to dynamically attach, manage and access a netSCSI device coupled to a network, using local addressing and broadcast messaging, in accordance with one embodiment of the present invention.

A flow chart 400A of the steps performed to dynamically attach, manage and access, with local addressing, a netSCSI device coupled to a network, via a broadcast message is presented in FIG. 4A. The steps presented in flowchart 400A will be described with reference to an example based on hardware illustrated in FIG. 3A that is described herein above. The steps provided in FIG. 4A treat all netSCSI devices as logical units on the same, single SCSI bus. When the number of SCSI units allowable; per software limitations occurs, the address mapping can include a virtual SCSI bus hierarchical layer above the network address to SCSI ID layer. Hence, a quantity of SCSI devices orders of magnitude greater than the software limitation can be dynamically mapped and managed on the network by using a logical SCSI bus with the present embodiment.

Step 402 is the announcement message step. In step 402, a broadcast message is received on a communication network from a netSCSI device coupled to the network. In the present embodiment, the broadcast message contains the Media Access Control (MAC) address, or the network address, of the netSCSI device. The broadcast message provides an automatic way for the netSCSI device to uniquely announce itself when newly added to a network, and thereby be attached, to computers on a network. As an example, this step can be illustrated using FIG. 3A wherein netSCSI device 310A would broadcast a message via network link 314 to the balance of the network 300A so as to satisfy step 402 of FIG. 4A. As previously mentioned, the broadcast message is received by all the devices on the network. There is no multicast grouping in the present embodiment.

Step 404 is the configuration step. In step 404, the next logical SCSI-ID/Logical Unit Number (LUN) is mapped to the Network Address of the netSCSI device. As previously mentioned, the present embodiment uses local address mapping. Hence, computers participating in the network will map a netSCSI device that broadcasts itself to the network. Whether the mapping remains in a computer depends on whether the computer claims the netSCSI device. This step will be manifested in the tables below after incorporating subsequent steps.

Step 406 is the attachment step at a computer. In step 406, a computer coupled to the network can claim ownership the netSCSI device via a message of ownership transmitted to the netSCSI device. This is a race in time situation where any one of multiple computers coupled to a network could reserve the netSCSI device, or a portion of the netSCSI device if it is partitioned. Hence, this step can occur for each partition on a drive for all new netSCSI drives that boot up on the network. Thus, one partition of a drive, e.g. netSCSI 310A of FIG. 3A could be reserved by Client 306A or Client 306B or Server 302A or Server 302B. The example illustrated in Table A1 and Table A2 indicates that Server 302A claims ownership of partition 318B of netSCSI 310B.

Step 408 is part of the attachment step of the netSCSI device to a computer in the network. In step 408, a netSCSI device receives the message of ownership from the host computer claiming it. The message, listing the network address of the host computer claiming it, is recorded at the netSCSI device. This step essentially closes the loop between the computer and the netSCSI device. Now the netSCSI device has the network address of its owner, and will include it in the address header for any message it needs to communicate with its owner.

After this initial configuration, if the netSCSI device reboots for any reason, it does not have to broadcast an announcement message again. Rather, it will unicast an alert message to the owner to re-establish the logical communication link. The netSCSI device knows its owner because the netSCSI device recorded the owners name in attachment step 408.

Step 409 is the access step. In step 409, a server or client computer can communicate with, or access, the netSCSI device by using the address map. Thus, for example, an upper layer entity (e.g. file system, SCSI device management utility, etc.) running on the host computer can call out a logical SCSI ID for retrieving or saving information. The host computer will cross-reference the logical SCSI ID to the corresponding network address in the address map, similar to that in Table A1. At this point, the host computer could prepend the network address to the SCSI packet of information and send the packet out on the network. The appropriate netSCSI device would recognize its address and retrieve the data packet.

By combining this step with the previous step, an address table, resembling a portion of Table A1 and A2 below, would arise based on the hardware example of FIG. 3A:

TABLE A1

Address Map in Server 302A

ADDRESS MAP:

| Line | Logical SCSI-ID | netSCSI Unicast Network Address (48 bit) | Owner | netSCSI device |
|---|---|---|---|---|
| 1 | 1 | 00:01:02:03:04:05 | 302A | netSCSI 310A |
| 2 | 2 | 00:01:02:03:04:06 | 302A | Partition 318B of netSCSI 310B |

TABLE A2

Address Map in Server 302B

ADDRESS MAP:

| Line | Logical SCSI-ID | netSCSI Unicast Network Address (48 bit) | Owner | netSCSI device |
|---|---|---|---|---|
| 1 | 1 | 00:01:02:03:04:06 | 302B | Partition 318A of netSCSI 310B |

Using Table A1 and Table A2 as an example, if netSCSI 310A was the first device to be attached to the network 300A, Server 302A would map netSCSI 310A to Logical SCSI-ID. 1 because that is the first device that server 302A has mapped. If thereafter, a new netSCSI device was added to the network, e.g. netSCSI 310B, it would provide a broadcast message on network 300A. If Server 302B responds to this broadcast message first by reserving partition 318A, then netSCSI 310B is mapped to logical SCSI-ID 1. The value for the logical SCSI-ID is '1' because the device is the first logical SCSI ID mapped with respect to server 302B. Similarly, if Server 302A responds second to the broadcast message sent by netSCSI 310B, and if a partition is unclaimed, e.g. partition 318B, then the partition of netSCSI 310B is mapped to logical SCSI-ID 2. The logical SCSI-ID is '2' instead of 1 because it is the second logical SCSI-ID with respect to server 302A. Note that a single SCSI device, e.g. SCSI 310B can have two different logical addresses, e.g. logical SCSI-IDs 1 and 2 in Table 1, depending upon which computer reserves it, e.g. Server 302B and Server 302A, respectively. However, the network address for a given netSCSI device is the same regardless of how many partitions it has. The partition is identified as an additional parameter in the original ownership message. By using this method, a large number of netSCSI devices can automatically be managed, addressed, and accessed on a network system.

Several alternatives exist for the present embodiment. For example, while the present embodiment only illustrates the method as applied to netSCSI devices coupled to the network, the present invention is also applicable to SCSI devices attached to netSCSI nodes via a SCSI bus. The last flowchart, flowchart 400E, provides an embodiment of how this configuration would be implemented. Several other alternative embodiments applicable to the present flowchart are described near the end of the detailed description

CENTRAL ADDRESSING USING BROADCAST MESSAGES

Figure 4B:
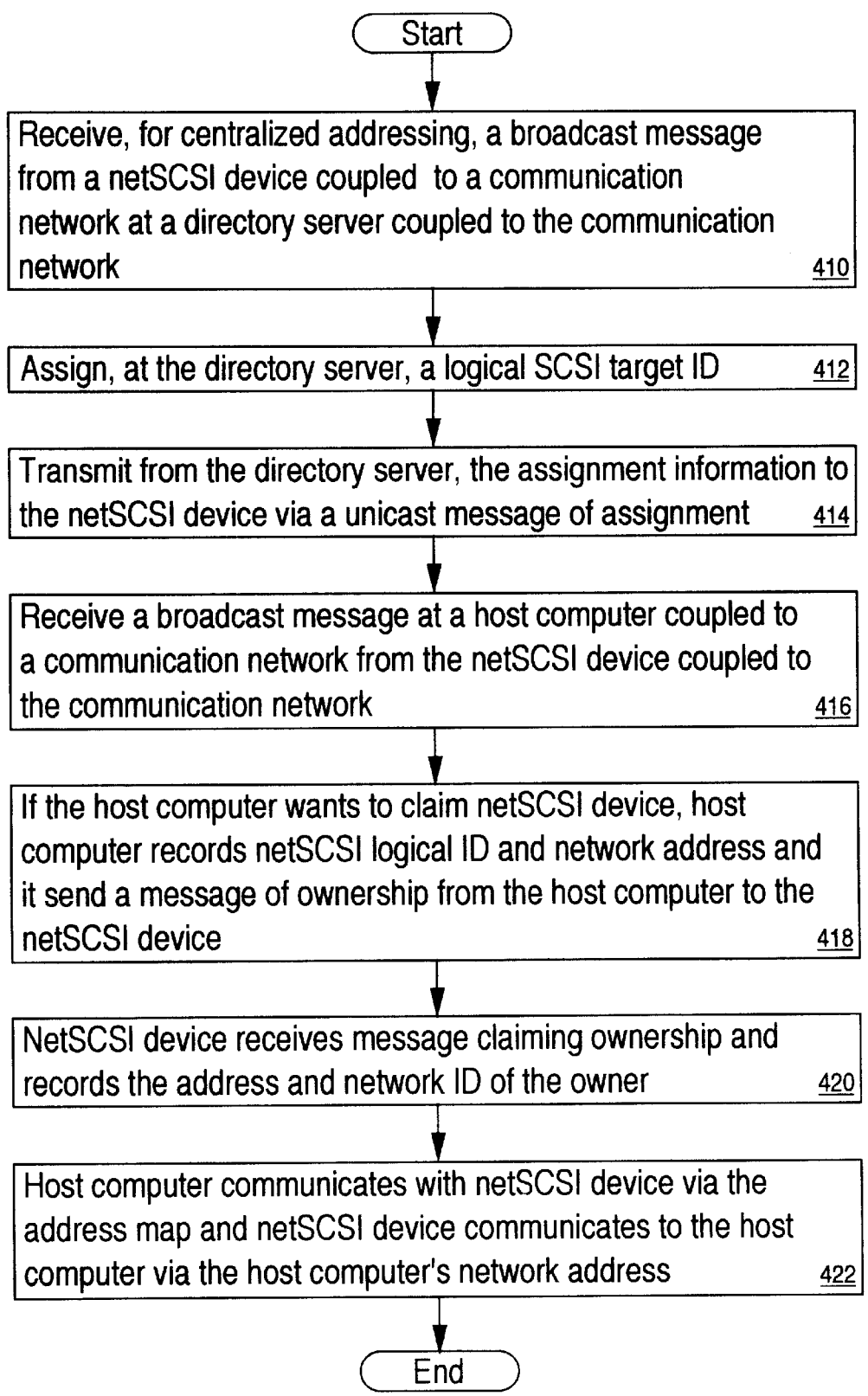
FIG. 4B is a flow chart of the steps performed to dynamically attach, manage and access a netSCSI device coupled to a network, using centralized addressing and broadcast messaging, in accordance with one embodiment of the present invention.

A flow chart 400B of the steps performed to dynamically attach, manage and access, with centralized addressing, a netSCSI device coupled to a network, via a broadcast message is presented in FIG. 4B. Like flowchart 400A, the steps presented in flowchart 400B will be described with reference to an example based on hardware illustrated in FIG. 3A that is described herein above. The alternate embodiment of a logical bus is available for flowchart 400B as was for flowchart 400A, albeit with a different addressing method.

A difference between flowchart 400A and 400B is that 400A performs address mapping locally, e.g. at each host computer coupled to the network, while flowchart 400B performs the address mapping at a central location, e.g. a dedicated directory server computers The advantages to centralized addressing are discussed herein above.

Step 410 is the announcement step. In step 410, a broadcast message of announcement is received on a communication network from a netSCSI device coupled to the network. The broadcast message of step 410 is essentially the same as the broadcast message provided in step 402 for FIG. 4A. Because the present embodiment uses a broadcast message, it is sent to all the host computers on the network. The difference between flowchart 400A and the present flowchart 400B will manifest itself in [th]e subsequent steps.

Step 412 is the assignment step. In step 412, the directory server assigns a logical SCSI target ID to the netSCSI device. While all the host computers receive the broadcast message from the netSCSI device, only the host computer dictated as the directory server will perform the mapping and assigning of logical SCSI IDs. Hence, this is a difference between flowchart 400A and the present flowchart 400B. In flowchart 400A, each host computer coupled to the network mapped its own local logical SCSI target for a netSCSI device that announces itself to the network. Thus, with flowchart 400A, a local logical SCSI target ID could be different for different host computers. In contrast, the present embodiment of flowchart 400B maps a logical SCSI ID for a given netSCSI unit that is consistent throughout the network. Hence, it provides the benefit of central monitoring of netSCSI devices, owners of the netSCSI devices, etc. The assignment step simply provides a network handle for the SCSI unit. It does not, in the present embodiment, provide ownership to any given user. That arises in a subsequent step.

In step 414, the assignment information from the previous step is transmitted from the director server to the netSCSI device via a unicast message of assignment. This step essentially provides the netSCSI device with a logical SCSI ID with which it can advertise itself, in subsequent steps, to prospective host computers on the network.

In step 416, a broadcast message is received at a host computer coupled to the communication network from the netSCSI device coupled to the communication network. The message provides the network address and the logical SCSI ID of the netSCSI device. This present embodiment is a broadcast message, and hence, all host computers coupled to the network should receive the message. In this step, the netSCSI device is essentially saying that it is available for ownership, and gives its address information so that the subsequent ownership claiming step can be performed.

Step 418 is the attachment step. In step 418, the host computer that wants to claim the netSCSI device will record the netSCSI logical ID and the network address that the netSCSI just transmitted. Then it will send a message of ownership to the netSCSI device to provide its owner address for the netSCSI device to record.

In step 420, the netSCSI device receives the message from the host computer claiming ownership, and it records the address and network ID of the owner for subsequent communication with the owner.

In step 422, the host computer communicates with the netSCSI device via the address map. Specifically, the host computer will convert the logical SCSI ID from an application program, typically within host computer, to the netSCSI device's unicast network address, and will send the packet of information on the network to the netSCSI ID using the NetSCSI's network ID. This last step is not necessary for the dynamic addressing of the netSCSI unit. However, it is a natural extension of how the dynamically assigned address will be implemented for communication on the network.

By combining this step with the previous step, an address table, resembling a portion of Table B1 below, would arise, based on the hardware example of FIG. 3A:

TABLE B1

Address Map in Server 352A designated as the Directory Server

ADDRESS MAP

| Line | Logical SCSI target ID for netSCSI | Unicast LAN/IP address of netSCSI device | Representation in Figure | Owner |
|---|---|---|---|---|
| 1 | 1 | 00:01:02:03:04:05 | netSCSI 310A | Server 302A |
| 2 | 2 | 00:01:02:03:04:06 | Partition 318B of netSCSI 310B | Server 302A |
| 3 | 3 | 00:01:02:03:04:06 | Partition 318A of netSCSI 310B | Client 306B |

Using Table B1 as an example for flowchart 400B, it is immediately distinguishable from Table A1 and A2 used for flowchart 400A. First of all, there is only one address map for flowchart 400B, e.g. Table B1. In contrast, flowchart 400A could have as many address maps as there are host computers because each host computer performs its own local address map. For the present embodiment, a directory server is a single device that performs the mapping.

Still referring to Table B1, if netSCSI 310A provided a broadcast message on network 300A first, directory server, server 352A, would map netSCSI 310A to Logical SCSI-ID '1.' Server 352A was selected, randomly, for the directory server. The directory server could be any host computer, client or server, indicated by a network administrator, or configured with software, to perform the operation. Continuing with the mapping, if partition 318B of netSCSI 310B is the second device to provide a broadcast message on network 300A, then directory server, server 352A, would map it to a logical SCSI-ID of '2.' Similarly, if partition 318A of netSCSI 310B is the third device to provide a broadcast message on network 300A, then directory server, server 352A, would map it to a logical SCSI-ID of '3.'

Several alternatives exist for the present embodiment. For example, while the present embodiment only illustrates the method as applied to netSCSI devices coupled to the network, the present invention is also applicable to SCSI devices attached to netSCSI nodes via a SCSI bus. The last flowchart, flowchart 400E, provides an embodiment of how this configuration would be implemented. Several other alternative embodiments applicable to the present flowchart are described near the end of the detailed description

LOCAL ADDRESSING USING MULTICAST MESSAGES

Figure 4C:
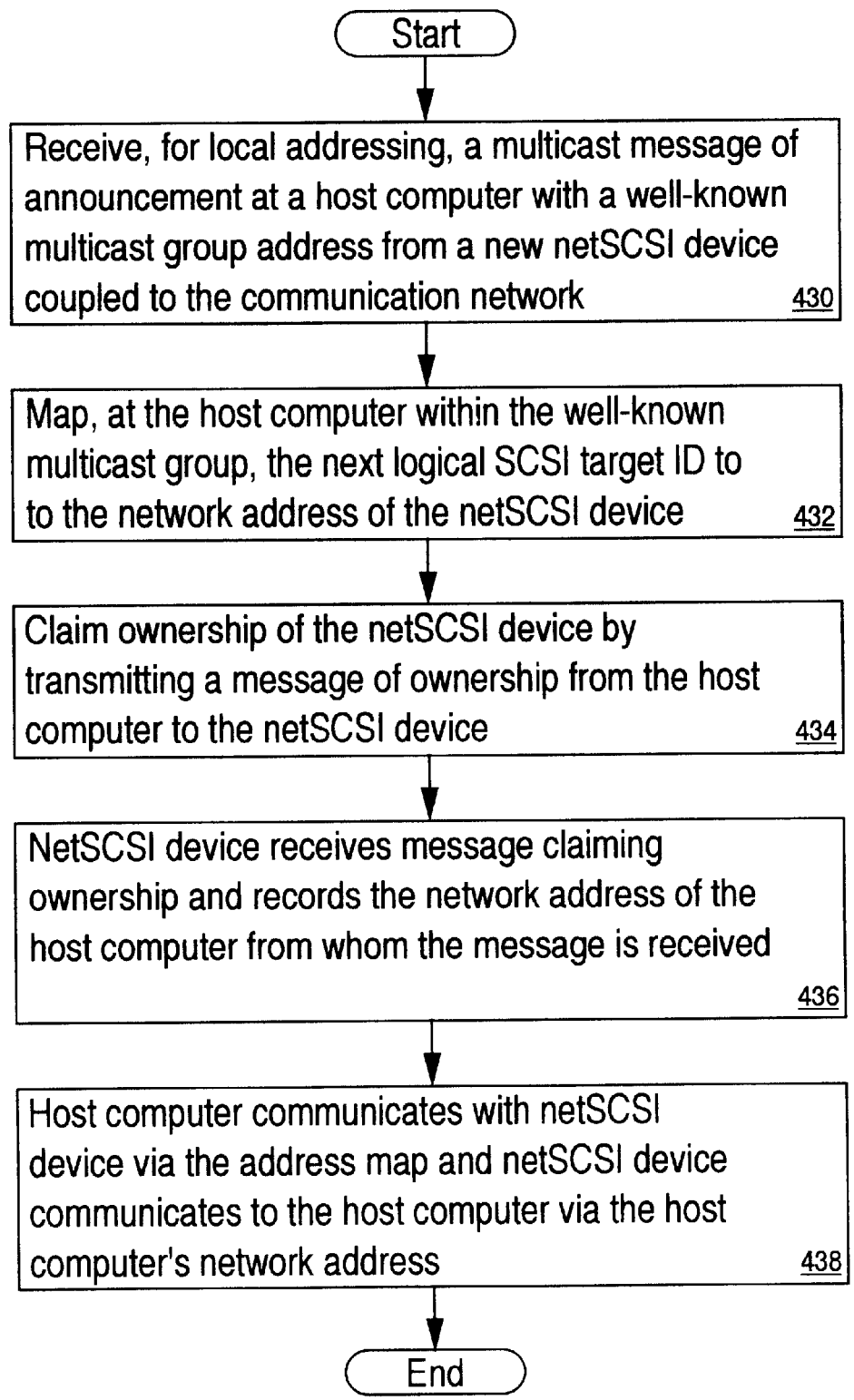
FIG. 4C is a flow chart of the steps performed to dynamically attach, manage and access a netSCSI device coupled to a network, using local addressing and multicast messaging, in accordance with one embodiment of the present invention.

A flow chart 400C of the steps performed to dynamically attach, manage and access, with a local multicast address, a netSCSI device coupled to a network, is presented in FIG. 4C. Flowchart 400C is essentially the same as flowchart 400A except that messaging used for dynamically performing the addressing are transmitting via a multicast messages instead of broadcast messages. By using multicast messages, the present embodiment accomplishes the dynamic addressing with less network traffic. That is, instead of sending broadcast messages to all host computers coupled to the network, the netSCSI device sends a multicast message to only a portion of the network. This cuts down on traffic and burden on the balance of the network. Additionally, the multicast messaging provides a convenient way for segregating network resources and users.

In step 430, a multicast message of announcement is received within a well-known multicast group address from a netSCSI device coupled to the network. As previously mentioned, the essential difference between flowchart 400A and 400C is that the messages sent for dynamic addressing in flowchart 400A are multicast messages. Hence, for step 430, the message is not interpreted by every host computer coupled to the network. Rather, it is only interpreted by a host computer that is within the well-known multicast group address.

The multicast group address for the present embodiment can be a group address that is specified by an industrial organization, a standards organization, or by a network administrator. The significance is that network traffic is reduced by having the netSCSI device only send its message to a portion of the network, e.g. the multicast group. Additionally, access and computing resources can be segregated by using the multicast group scheme. For example, a research and development group of users could be identified as a specific multicast group address. Subsequently, more powerful netSCSI devices could be automatically reserved for their group that requires powerful resources by using a netSCSI device with the same multicast group address as the design group. The present invention envisions many such combinations and permutations of allocating resources and segregating users using the multicast group address.

In step 432 the next logical SCSI target ID is locally mapped to the network address of the netSCSI device by a host computer within the well-known multicast group. If more than one host computer has the multicast group address, then each one can locally map a logical SCSI target ID to the SCSI unicast network address. Similar to step 430, this mapping is only performed by host computers within the multicast group that received the message from the netSCSI device. The map is stored locally in the host computer. Whether the mapping for the specific netSCSI device is retained for the specific netSCSI depends on whether the host computer claims the netSCSI device or may be granted access privileges after another host computer claims it. If the host computer does not claim ownership of the netSCSI device, then the mapping of the netSCSI device is not retained. However, if a host computer that is not the owner is allowed access to the netSCSI device, then it may also record the mapping for the device.

In step 434, the netSCSI can be claimed by transmitting a message of ownership to the netSCSI device claiming ownership of the netSCSI device by the computer. Again, only a host computer within the well-known multicast group can do this. The unicast network address of the host computer is included in the message so that the netSCSI device can identify the owner.

In step 436, the netSCSI being claimed receives the message from the host computer claiming ownership. The netSCSI records the network address of the host computer for subsequent communication with the owner.

In step 438, the host computer communicates with the netSCSI device via the address map. The netSCSI device communicates to the host computer via its network ID. In this manner, after the netSCSI has been integrated into the network, communication occurs on a unicast basis.

While tables have been presented to illustrate previous flowcharts, no table is presented for flowchart 400C. This is simply because flowchart 400C would result in tables essentially the same as tables for flowchart 400A. That is, host computers could each have a map table depending on their allocated multicast group address and the multicast group address used by the netSCSI device. One difference between flowchart 400C and 400A is that a limit exists on which host computers are even given the opportunity to claim ownership of a netSCSI device in flowchart 400C. Thus, for example, in FIG. 3B one multicast group 315 includes Server 302B and netSCSI 310A. Hence, Client 306A and 306B would not even interpret the initial multicast message from netSCSI 310A announcing itself to multicast group 315. Consequently, Client 306A and 306B would not realize that netSCSI 310A was on the network, was available, or could be claimed. A similar situation exists regarding netSCSI 310B in multicast group 317 with respect to server 302B.

Several alternatives exist for the present embodiment. For example, while the present embodiment only illustrates the method as applied to netSCSI devices coupled to the network, the present invention is also applicable to SCSI devices attached to netSCSI nodes via a SCSI bus. The last flowchart, flowchart 400E, provides an embodiment of how this configuration would be implemented. Several other alternative embodiments applicable to the present flowchart are described near the end of the detailed description

CENTRAL ADDRESSING USING MULTICAST MESSAGES

Figure 4D:
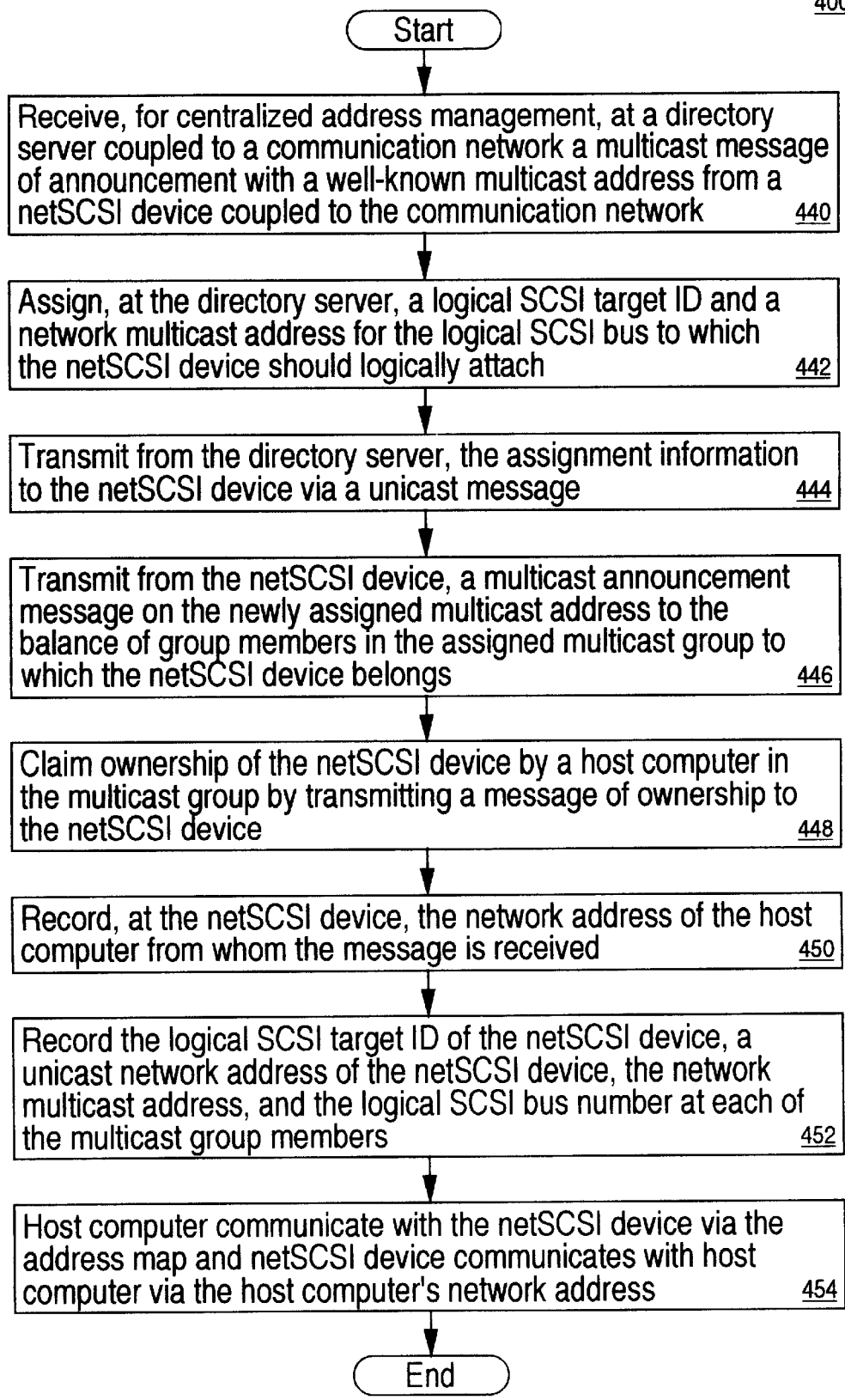
FIG. 4D is a flow chart of the steps performed to dynamically attach, manage and access a netSCSI device coupled to a network, using central addressing and multicast messaging, in accordance with one embodiment of the present invention.
Figure 4E:
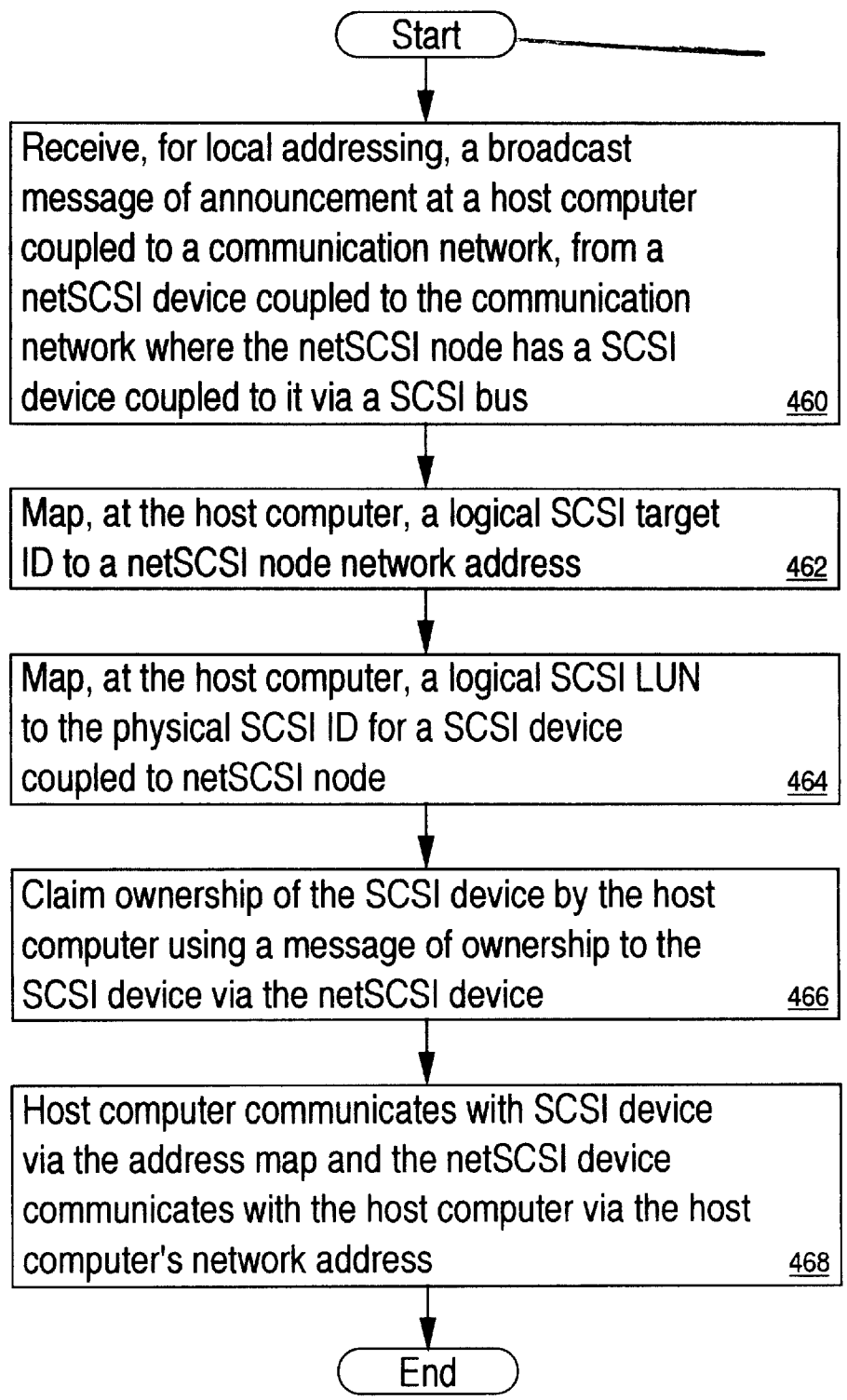
FIG. 4E is a flow chart of the steps performed to dynamically attach, manage and access a SCSI device coupled to a network via a netSCSI node, using local addressing and broadcast messaging, in accordance with one embodiment of the present invention.

A flow chart 400D of the steps performed to dynamically attach, manage and access, with a centralized address using multicast messaging, a netSCSI device coupled to a network, is presented in FIG. 4D. Flowchart 400D is like Flowchart 400C in that they,both use multicast messaging. But unlike flowchart 400C, flowchart 400D uses centralized addressing. Likewise, flowchart 400D is similar to flowchart 400B in that they both use centralized addressing, e.g. by a dedicated directory server. But unlike flowchart 400B, flowchart 400D uses multicast messaging instead of broadcast messaging. Hence, flowchart 400D is a hybrid of these previous flowcharts. The centralized addressing provides both globally unique SCSI address assignment. The globally unique SCSI address assignment allows for persistent associations between netSCSI devices and servers/clients. The multicast messaging allows for reduced network traffic during the dynamic addressing operations of a netSCSI device and allow for segregation of network resources. The steps presented in flowchart 400D will be described with reference to hardware illustrated in FIG. 3B described herein above.

Table D1 provides an example of the flowchart 400D applied to the hardware illustrate in FIG. 3B.

a protocol, industry standard, or network administrator. As illustrated in Table D1, the logical SCSI Ids are all sequential for a given network multicast group address for a logical bus.

As the present embodiment, step 442 includes a logical bus assignment for the netSCSI device as well as the logical SCSI ID. The logical bus refers to the apparent existence of a virtual bus created by the multicast group address. That is, if one netSCSI device can only send a multicast message, then host computers not having the multicast address do not

TABLE D1

Address Map in Server 352A designated as the Directory Server

ADDRESS MAP

| Line | Logical SCSI bus | Network Multicast address for netSCSI device | Logical SCSI target ID for netSCSI | Unicast address for netSCSI device | netSCSI device | Owner |
|---|---|---|---|---|---|---|
| 1 | 1 | 01:01:02:03:04:50 | 1 | 00:01:02:03:04:05 | netSCSI 310A | Server 302B |
| 1 | 1 | 01:01:02:03:04:50 | 2 | 00:01:02:03:04:07 | Partition 318B of netSCSI 310B | Server 302B |
| 3 | 2 | 01:01:02:03:04:60 | 1 | 00:01:02:03:04:06 | Partition 318A of netSCSI 310B | Client 306B |

In step 440, a multicast message of announcement to a well-known multicast address is received at a directory server on the communication network from a netSCSI device coupled to the communication network. Hence, step 440 is different from step 430 in flowchart 400C because in the present step, the netSCSI device announces itself to a well-known multicast group address that only includes a dedicated directory server. In contrast, the multicast message of step 430 would be interpreted by, typically a plurality of, host computers within the multicast group that would subsequently map the netSCSI device and ultimately claim ownership of it. In both steps, devices and host computers outside of the well-known multicast group address ignore the message, and thereby conserve resources. As illustrated in FIG. 3B, if netSCSI 310A is a newly attached device to the network, it will transmit a multicast message on network 300A to a well-known multicast group address. The multicast message is received on a well-known multicast group address, e.g. to server 302A that has been configured within the well-known multicast address. The multicast message includes the network unicast address of the new netSCSI device.

In step 442, a directory server assigns a logical SCSI target ID and a network multicast address for the logical bus to which the SCSI device should logically attach. Referring to FIG. 3A, a central computer, e.g. server 302A, will assign the appropriate addresses for a netSCSI device that boots up, e.g. netSCSI A 310A, on the network. In another embodiment, the central computer can be a device such as a directory server or a management station. As illustrated in FIG. 3B, a multicast group represented by the dashed line 315 has been chosen to include Server 302B. Similarly, Client: 306A, Client 306B, have been classified into a different multicast group, identified by dashed line 317. Thus, the directory server has the choice of selecting a multicast group address corresponding to a research and design engineering group, for example, rather than a customer service group, for assignment to the new netSCSI device. As previously mentioned, the well-known multicast group addresses number can be catalogued by, for example, even realize that the SCSI unit exists. The subsequent assignment and management of the netSCSI device occurs with complete anonymity to the host computers not within the multicast address. Hence, it appears to the host computers not within the multicast address, that the netSCSI device is not even coupled to them e.g. that the netSCSI device is on a different bus. For example, a well-known multicast group possibly reserved for a research and development engineering might be split into two or more logical busses. For example, one logical bus might link research and design engineers at one corporate campus while another logical bus might link research and design engineers at a foreign location.

Note that the virtual logical bus that arises from multicast assignment is different from the logical bus assignment from the SCSI address protocol. Though both categories of logical busses arise for a different need, they serve the same function of grouping SCSI devices. The SCSI address protocol logical bus is discussed near the end of the description.

In step 444, the directory server communicates the assignment information to the netSCSI device in a unicast message of assignment. The assignment information includes the logical SCSI-ID, the corresponding netSCSI network address, the network multicast address, and its corresponding logical SCSI bus. In this manner, the centralized assignment provides the netSCSI device with its logical SCSI handle that it can subsequently advertise to host computers within its multicast group as being available. Alternatively, the directory server can transmit the assignment information directly to the network multicast group, thereby skipping the step of having the netSCSI device communicating the assignment information to the network multicast group.

In step 446, the netSCSI device sends a multicast announcement message to the group members in the assigned multicast group to which the netSCSI device belongs. This step essentially limits the host computers to which the netSCSI will advertise itself as being available. Hence, the logical SCSI ID for the new netSCSI is only available to be claimed by host computers within the network multicast group. Hence, these devices are on a virtual bus, because only they are allocated to interpret the multicast message for the given network multicast address. Thus, as illustrated in Table D1, logical SCSI unit 1, e.g. netSCSI 310A, will broadcast to network multicast address "01:01:02:03:04:50" which has been previously allocated to the multicast group represented in FIG. 3B as dashed line 315. Hence, client 306A and client 306B will not even recognize the multicast message. This process provides the virtual SCSI bus that ignores host computers and devices not within the network multicast address, though physically coupled together on the network.

In step 448, a host computer in the assigned multicast group can claim ownership of the netSCSI device by transmitting a message from the host computer to the netSCSI device. The message includes the network unicast address of the host computer.

In step 450, the netSCSI device records the network address of the host computer from whom the message claiming ownership is received. In this manner, the netSCSI closes the loop between the host and the netSCSI device.

In step 452, each of the multicast group members within the assigned multicast address records the logical SCSI target ID of the netSCSI device, the unicast network address of the netSCSI device, the network multicast group address, and the logical bus number to which the SCSI belongs. Thus, for example, memory 312A of netSCSI 310A will record the information provided for line in Table D2.

In step 454, the netSCSI device communicates with the host computer by using the network address of the owner that it recorded. The host computer that owns the netSCSI device will, in turn, refer to the address table to retrieve the network address that corresponds to the logical address used in its application programs.

LOCAL ADDRESSING USING BROADCAST MESSAGES FOR SCSI DEVICES

A flow chart 400E of the steps performed to dynamically attach, manage and access, using broadcast messaging, a SCSI device coupled to a network via a netSCSI node, is presented in FIG. 3C. This configuration is essentially the same as FIG. 3A and flowchart 400A, except that it includes a non-netSCSI devices, e.g. simple SCSI devices, coupled downstream to the netSCSI node. The benefit of flowchart 400E is that the steps provide for dynamically attaching, managing, and accessing simple SCSI devices on a network system, even though they do not have network compatibility. Instead, the SCSI device relies on the netSCSI device located between itself and the network to perform the translation from SCSI packaging to network packaging of a transmitted message and from network packaging to SCSI packaging of a received message. The steps presented in flowchart 400E will be described with reference to hardware illustrated in FIG. 3C and described herein above.

More specifically, the hardware illustrated in FIG. 3C will be applied to flowchart 400E and documented in the following table, Table E1. This example is meant to illustrate the present embodiment. The present invention is applicable to a wide variety of network and device configurations and arrangements.

TABLE E1

Address Map in Server 352A

ADDRESS MAP

| Line | Logical SCSI-ID/LUN | Unicast address for netSCSI device | Physical SCSI ID | Owner | netSCSI Device | SCSI Device. |
|---|---|---|---|---|---|---|
| 1 | 1/1 | 00:01:02:03:04:01 | 1 | 352A | 360A | 362A |
| 2 | 1/2 | " | 5 | 352A | " | 362B |
| 3 | 2/1 | 00:01:02:03:04:02 | 6 | 352A | 360B | 362D |

TABLE E2

Address Map in Server 352B

ADDRESS MAP

| Line | Logical SCSI-ID/LUN | Unicast address for netSCSI device | Physical SCSI ID | Owner | NetSCSI Device | SCSI Device. |
|---|---|---|---|---|---|---|
| 1 | 1/1 | 00:01:02:03:04:02 | 1 | 352B | 360B | 362D |

Step 460 is essentially the same step as step 402 of flowchart 400A. The difference is that step 460 includes a SCSI device coupled to the netSCSI node. And now, the broadcast message from the netSCSI device includes its own unicast network address as well as the physical SCSI ID of the SCSI unit attached to it.

Step 462 is essentially the same step as step 404 of flowchart 400A. In both these steps, the netSCSI unicast network address is mapped to the next logical address in a host computer.

In step 464, a logical SCSI LUN is mapped to the physical SCSI ID for the SCSI device coupled to the netSCSI node. This step is not included in flowchart 400A because there were no SCSI devices used in flowchart 400A. In this manner, a translation from the logical SCSI ID used in an application program can be translated to its corresponding physical ID when a message is sent to the physical unit.

In step 466, a host computer may claim ownership of a SCSI device coupled to a netSCSI node by transmitting a response message to the netSCSI device to which the SCSI device is attached. The response message includes the unicast address of the host computer claiming ownership and it includes the physical SCSI LUN.

In step 467, the appropriate netSCSI node receives the message claiming ownership and it records the owner's unicast network address and the physical SCSI LUN.

In step 468, the host computer communicates with the SCSI device by using the address map in its memory. It does so by receiving from an application program, instructions to communicate to a given logical SCSI ID/LUN device. The host computer then retrieves the network unicast address of the netSCSI device corresponding to the logical SCSI ID and the physical SCSI ID corresponding to the logical LUN device. The host program then structures the packet of information with a header for the network address of the netSCSI device and a SCSI header with the physical ID of the SCSI device to which the netSCSI device will route the data packet.

In this manner, the netSCSI in flowchart 400E acts as a translator between the network message and the SCSI packet. The method presented in flowchart 400E, although applied to a local addressing using broadcast messaging, is applicable to all the previous flowcharts, e.g. flowchart 400A, 400B, 400C and 400D. By using this method, non-network compatible SCSI devices can be dynamically attached, managed, and accessed on a network.

Several alternative embodiments exist for the present invention illustrated in all the prior flowcharts, e.g. flowchart 400A, 400B, 400C, 400D, and 400E. The specific quantity of devices, and their layout, used for the illustration are just an example. The present invention is well suited to many different quantities, types, and layouts of devices in alternative types of networks. Also, as mentioned previously, the steps provided in FIG. 4B for the present embodiment treat all netSCSI devices as logical units on the same, single SCSI bus. However, a logical bus scheme using SCSI protocol could also be implemented with the mapping. In that case, a virtual bus designation would be included with the logical SCSI ID mapped to the netSCSI device's unicast network address. The logical SCSI bus would add an additional layer of hierarchy to the address of a netSCSI or SCSI unit.

Additional alternative include the following embodiments. One embodiment presented utilizes a host computer to perform and record the mapping operation. Alternatively, the netSCSI devices could be programmed to perform and record the mapping itself instead of the host computer. Subsequently, the netSCSI device could translate a network ID from a client to a SCSI address within itself. Additionally, one embodiment presented envisions a single computer having access to the netSCSI resource. However, the present invention can be applied to a computer other than the host computer that wants to communicate with the netSCSI and has privileges to do so after the netSCSI has been claimed. Note that the present invention utilizes the dynamic attachment of netSCSI and SCSI devices when they are first added to a network. This step typically occurs when a new netSCSI is added to a network and has not yet been claimed. Alternatively, netSCSI devices having other types of status could benefit from using the present invention. For example, a reconfiguration of a netSCSI device could occur as dictated or approved by a network administrator or user. After this attachment step is performed and owners are established for the devices, they communicate using the assigned addresses. If, after the initial attachment and assignment is completed, a netSCSI or SCSI device has to reboot, it does not have to broadcast an announcement message. Rather it will unicast an alert message to the owner, whose address it has in memory, to re-establish the logical communication link.

In conclusion, the present invention provides a method and apparatus for accommodating more SCSI devices on a bus and for placing them at greater distances on the bus than would be feasible on a conventional SCSI bus. The present invention also provides a method and apparatus for dynamically addressing SCSI devices automatically to avoid address conflicts. Additionally, the present invention provides a network system and configuration that can accommodate peripherals independent from the server that can be placed on the network. Furthermore, the present invention provides a method and apparatus that allows SCSI devices to be attached to the LAN, be recognized by the hosts/clients and other SCSI devices on the same LAN or IP, network automatically, and for the LAN/IP address of the netSCSI device to be bound to a logical SCSI ID. The present invention also allows the use of standard SCSI devices on a network such that backwards compatibility is maintained. Finally, the present invention provides a protocol in which to encapsulate data and SCSI commands into a coherent network-compatible packet.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

We claim:

1. In a communication network communicatively coupling a netSCSI device and a computer Via a non-SCSI bus, a method for locally, dynamically and automatically attaching, managing, and accessing said netSCSI device using a network protocol, said method comprising the steps of:

a) receiving, at said computer, a message of announcement from said netSCSI device, said message of announcement including a network address of netSCSI device such that said netSCSI device may be attached to the network without an address conflict;

b) address mapping, locally at said computer, a logical SCSI ID to said network address of said netSCSI device; and c) claiming ownership of said netSCSI device for said computer, if desired, by transmitting a unicast message of ownership from said computer to said netSCSI device, said message of ownership including a network address of said computer.

2. The method as recited in claim 1 further comprising the step of:

d) recording the network address of said computer at said netSCSI device for sending messages from said netSCSI device to said computer; and e) communicating from said computer to said netSCSI device using said network address of said netSCSI device corresponding to said logical SCSI ID as retrieved from an address table created from said step of address mapping.

3. The method as recited in claim 2, wherein step e) is comprised of the following steps:

e1) receiving said logical SCSI ID specified by an upper layer entity request to communicate with said netSCSI device within said computer;

e2) retrieving said network address of said netSCSI device, from said address map, corresponding to said logical SCSI ID;

e3) encapsulating a SCSI command message into a network packet;

e4) forwarding said network packet to said communication network; and e5) retrieving said SCSI command message from said network packet at said netSCSI device.

4. The method as recited in claim 1 wherein said address mapping step accounts for a logical SCSI bus hierarchy the logical SCSI ID assignment to said netSCSI device.

5. The method as recited in claim 1 wherein said message of announcement received at said computer from said net device is a broadcast type of message.

6. The method as recited in claim 1 wherein said message of announcement received at said computer from said netSCSI device is a multicast message.

7. The method as recited in claim 6 wherein said address mapping step is performed only if said computer has a network address within said multicast address specified in said message of announcement from said netSCSI device, and wherein said step of claiming ownership can only occur by said computer if it has a network address within the multicast address specified in said message of announcement from said netSCSI device.

8. In a communication network communicatively coupling at least one netSCSI device and at least one computer via a non-SCSI bus, a method for centrally, dynamically and automatically attaching, managing, and accessing said netSCSI device using a network protocol, said method comprising the steps of:

a) receiving, at a directory server computer coupled to said communication network, a message of announcement from said netSCSI device, said message of announcement including a network address of said netSCSI device such that said netSCSI device may be attached to the network without an address conflict;

b) address mapping, centrally at said directory server computer, a logical SCSI ID to said network address of said netSCSI device, said logical SCSI ID providing a link to said network address of said netSCSI device;

c) transmitting a message of assignment from said computer acting as said directory server to said communication network, said message of assignment including said network address and a corresponding logical SCSI ID from said address map; and d) claiming ownership of said netSCSI device by transmitting a message of ownership to said netSCSI device from said directory server or from a host computer coupled to said network, said message of ownership indicating a network address of an owner.

9. The method as recited in claim 8 further comprising the steps of:

e) receiving said message of assignment as a unicast message to said netSCSI device;

f) transmitting said message of assignment from said netSCSI device to said communication network; and g) recording the network address of said computer at said netSCSI device for sending messages from said netSCSI device to said computer.

10. The method as recited in claim 8 wherein said address table accounts for a logical SCSI bus hierarchy in the logical SCSI ID assignment to said netSCSI device.

11. The method as recited in claim 9 wherein said message of announcement is a broadcast type of message and said message of assignment transmitted from said netSCSI device to said communication network is a broadcast type of message.

12. The method as recited in claim 9 further comprising the step of:

b) address mapping, centrally at said directory server computer, a logical SCSI bus corresponding to a network multicast address to which said netSCSI device should belong.

13. The method as recited in claim 12 wherein said message of announcement is a multicast message to a well-known multicast address corresponding to said directory server computer, said message of assignment including assignment information for said logical SCSI bus and said network multicast address, and said message of assignment transmitted from said netSCSI device to said communication network is a multicast message corresponding to said network multicast address assigned to it.

14. The method as recited in claim 12 wherein said step of claiming ownership can only occur if said host computer or said directory server has the multicast address specified in said message from said netSCSI device.

15. In a communication network communicatively coupling at least one SCSI device to a netSCSI device via a SCSI bus, and communicatively coupling said netSCSI device to, at least one computer via a non-SCSI bus, a method for dynamically and automatically attaching, managing, and accessing said SCSI device using a network protocol, said method comprising the steps of:

a) receiving, at said netSCSI device, a message of identification from said SCSI device, said message of identification indicating the physical ID of said SCSI device;

b) receiving, at a computer coupled to said communication network, a message of announcement from said netSCSI device, said message of announcement including a network address of said netSCSI device and said physical ID of said SCSI device such that said SCSI device may be attached to the network without an address conflict;

c) address mapping, at said computer, a logical SCSI ID to said network address of said netSCSI device and a logical SCSI-LUN to said physical ID of said SCSI device, said logical SCSI ID and logical SCSI LUN providing a link to said network address of said netSCSI device and to said physical ID of said SCSI device; and d) claiming ownership of said SCSI device for said computer, if desired, by transmitting a message of ownership from said computer to said SCSI device, via said netSCSI device, said message of ownership including a network address of said computer.

16. The method recited in claim 15 wherein said method of dynamically and automatically attaching, managing, and accessing a SCSI device can be performed using local addressing in one case and using central addressing in another case, and can be performed using multicast messaging in one case and using broadcast messaging in another case.

17. A netSCSI device capable of being coupled, via a non-SCSI bus, to a computer within a communication network, said netSCSI device also capable of being dynamically attached, managed, and accessed by the computer, said netSCSI device comprising:

a processor; and a computer readable memory unit, said computer readable memory unit coupled to said processor, said computer readable memory unit containing program instructions stored therein that execute, via said processor, a method for allowing said netSCSI device to be dynamically attached, managed, and accessed by a computer coupled to said netSCSI device, said method comprising the steps of:

a) transmitting a message of announcement from said netSCSI device onto said communication network, said message of announcement providing a network address uniquely identifying said netSCSI device such that said netSCSI device may be attached to the network without an address conflict; and b) receiving a message of ownership from a computer.

18. The netSCSI device recited in claim 17 wherein said method, stored as program instructions in said computer readable memory unit and executed via said processor, includes the additional steps of:

c) recording, in said computer readable memory unit, a network address of said computer;

d) receiving a first network packet from said computer;

e) interpreting the SCSI command message embedded within said network packet;

f) encapsulating a reply SCSI message within a second network packet; and g) transmitting said second network packet on said communication network to said network address of said computer.

19. The netSCSI device recited in claim 18 wherein said method, stored as program instructions in said computer readable memory unit and executed via said processor include the additional steps of:

h) receiving a message of assignment from a directory server;

i) transmitting said message of assignment to a multicast group; and j) recording address information from said message of assignment for future communication.

20. The netSCSI device recited in claim 19 wherein said message of announcement can be a broadcast message in one case and can be a multicast message in another case.

21. A computer for dynamically attaching, managing, and accessing a netSCSI device within a communication network, said netSCSI device coupled to said computer via a non-SCSI bus, via a network multicast centralized address, said computer comprising:

a network interface;

a processor, said processor coupled to said network interface; and a computer readable memory unit, said computer readable memory unit coupled to said processor, said computer readable memory unit containing program instructions stored therein that execute, via said processor, a method for dynamically attaching, managing, and accessing a netSCSI device coupled to a network, said method comprising the steps of:

receiving, at said computer, a message of announcement from a netSCSI device, said message providing a network address of said netSCSI device, said network address uniquely identifying said netSCSI device such that said netSCSI device may be attached to the network without an address conflict; and address mapping, at said computer, a logical SCSI ID for said netSCSI device, said logical SCSI ID providing a link between said logical SCSI ID used in an application program and said network address of said netSCSI device.

22. The computer recited in claim 21 wherein said method, stored as program instructions in said computer readable memory unit and executed via said processor, further comprises the step of:

transmitting a message of ownership to said netSCSI device, said message of ownership including a network address of said computer.

23. The computer recited in claim 21 wherein said method, stored as program instructions in said computer readable memory y unit and executed via said processor, further comprises the steps of:

receiving, at said computer, a message from a netSCSI device, said broadcast message providing a physical SCSI ID of a SCSI device coupled to said netSCSI device by a SCSI bus; and address mapping, via said computer, a logical SCSI LUN for said SCSI device, said logical SCSI LUN providing a link between said logical SCSI LUN used in an application program and said physical SCSI ID of said SCSI device.

24. The computer recited in claim 21 wherein said computer acts as a server computer and wherein said method, stored as program instructions in said computer readable memory unit and executed via said processor, further comprises the steps of:

transmitting a message of assignment, said message of assignment providing assignment information from said address mapping step.

25. The computer recited in claim 21 wherein said method, stored as program instructions in said, computer readable memory unit and executed via said processor, further comprises the step of:

address mapping SCSI logical ID with respect to a logical SCSI bus hierarchy.

* * * * *